(12) United States Patent
Forbes

(10) Patent No.: US 6,352,400 B1
(45) Date of Patent: Mar. 5, 2002

(54) RAIL ROAD LOADING APPARATUS AND METHOD

(75) Inventor: James W. Forbes, Campbellville (CA)

(73) Assignee: National Steel Car Limited, Hamilton (CA)

( * ) Notice: Subject to any disclaimer, the term of this patent is extended or adjusted under 35 U.S.C. 154(b) by 0 days.

(21) Appl. No.: 09/632,706

(22) Filed: Aug. 4, 2000

(51) Int. Cl.$^7$ ................................................ B65G 69/28
(52) U.S. Cl. .................. 414/339; 414/401; 414/537; 14/72.5
(58) Field of Search ................ 414/333, 339, 414/401, 537, 373; 14/72.5

(56) References Cited

U.S. PATENT DOCUMENTS

| | | | |
|---|---|---|---|
| 3,012,524 A | * 12/1961 | Buisson et al. | 414/333 X |
| 4,065,825 A | * 1/1978 | Cohen | 14/72.5 |
| 4,960,356 A | * 10/1990 | Wrenn | 414/537 |
| 5,338,050 A | * 8/1994 | Haire et al. | 280/476.1 |

FOREIGN PATENT DOCUMENTS

| | | | | |
|---|---|---|---|---|
| DE | 19630359 | * | 1/1998 | 414/339 |

* cited by examiner

Primary Examiner—Steven A. Bratlie
(74) Attorney, Agent, or Firm—Hahn Loeser & Parks LLP

(57) ABSTRACT

A rail road car has a deck for carrying wheeled vehicles. The vehicles are loaded from the ground by use of a movable ramp that is positioned next to a separate coupler end of the rail road car. The ramp has a locating guide, in the nature of a pair of tapered prongs, that locate in mating sockets in the end of the rail road car. The co-operation of the guides and sockets forces the ramp to align with the deck of the rail road car in a predetermined position, namely aligned centrally with the deck. The ramp has a telescoping, pivoting boom. The boom has a hitch that can be engaged by a towing vehicle, permitting the ramp to be moved into position as desired. The boom can then be collapsed and lowered out of the way of the path of the wheeled vehicles. The boom is counterweighted to facilitate manual operation.

32 Claims, 6 Drawing Sheets

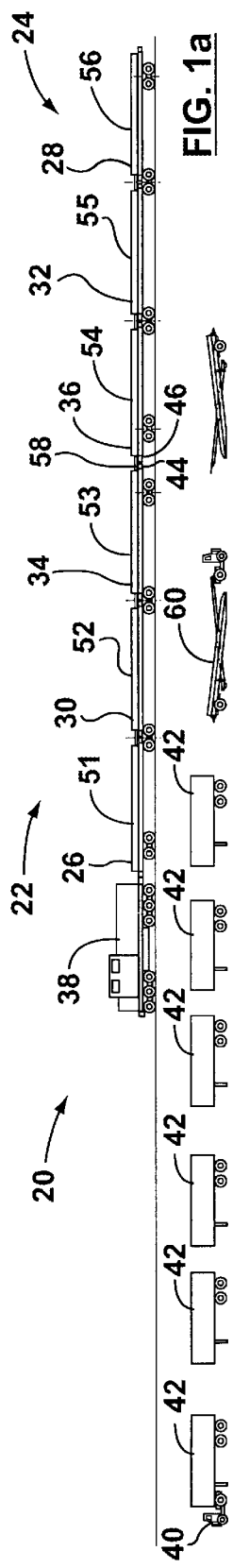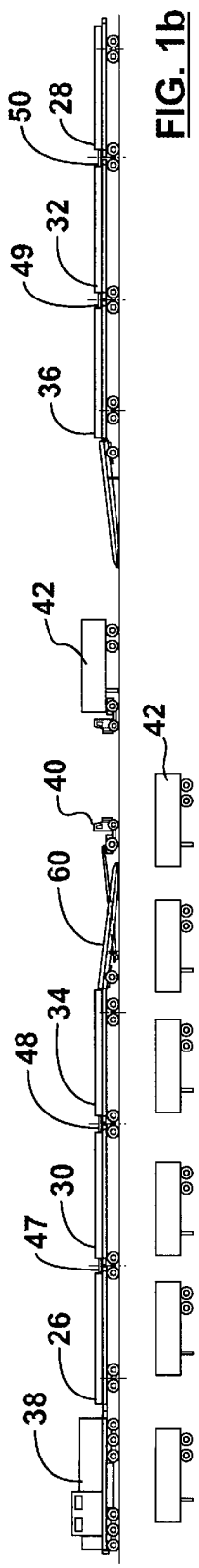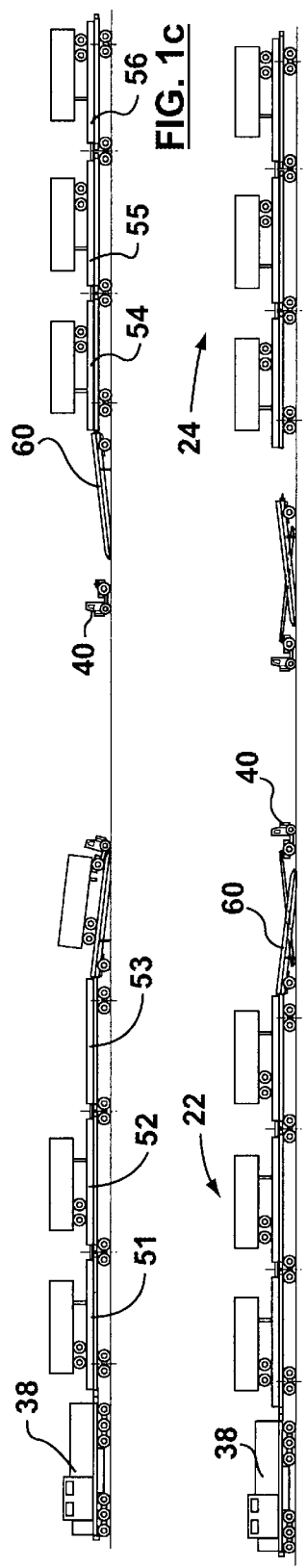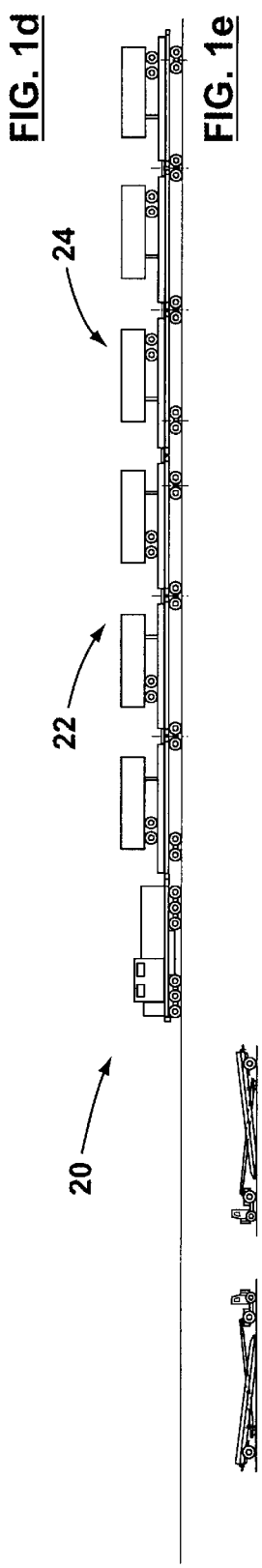

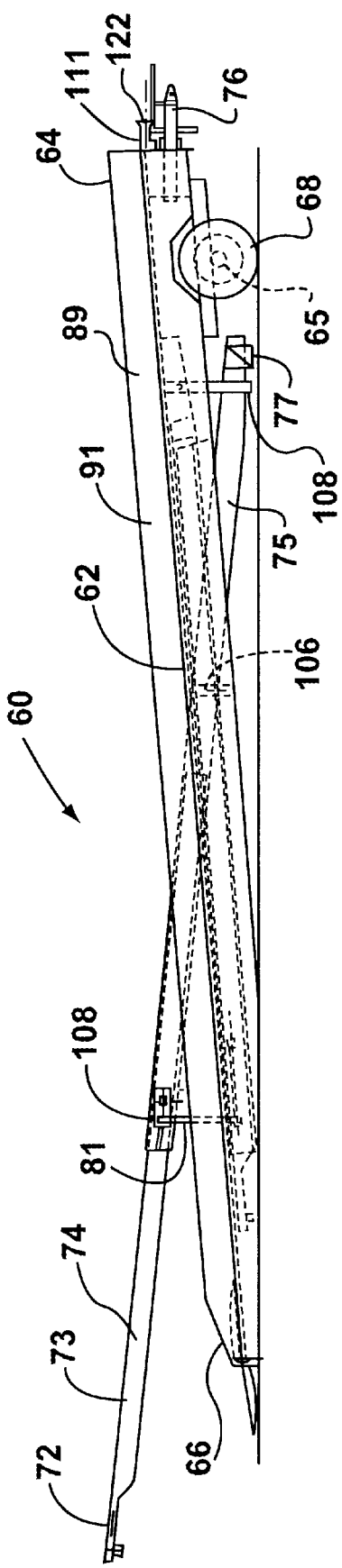
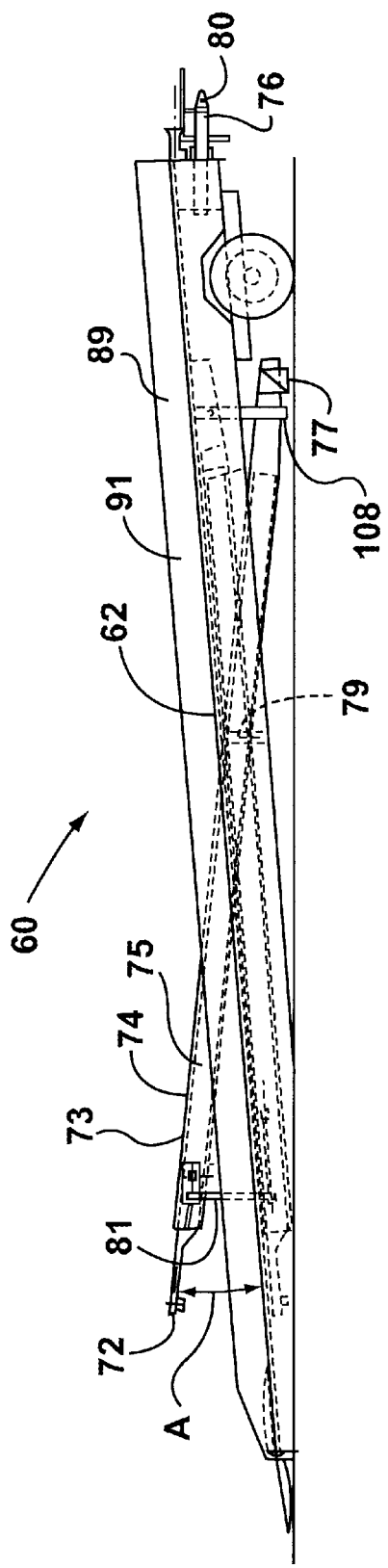
FIG. 2b
FIG. 2c

RAIL ROAD LOADING APPARATUS AND METHOD

FIELD OF THE INVENTION

This invention relates to the field of rail road cars for carrying wheeled vehicles, and, in particular, to apparatus and a method for loading vehicle carrying rail road cars.

BACKGROUND OF THE INVENTION

Railroad flat cars are often used to transport highway trailers from one place to another. One method of loading highway trailers, or other wheeled vehicles onto rail road cars having decks for carrying vehicles is by what is called circus loading. A ramp is placed at one end of a string of rail car units, and then each vehicle is loaded in sequence by driving along the decks of the rail road car units. The gaps between successive rail car units are spanned by bridge plates. Although circus loading is common for a string of cars, end-loading can be used for individual rail car units, or multiple rail car units as may be convenient.

It is common for movable ramps to be employed to permit trailers to be driven up onto the rail cars. In recent years there has been an emphasis on reducing the loading time required in intermodal service, and in increasing the length of intermodal trains. Another trend has been toward the increased use of articulated rail road cars, as opposed to single unit cars employing standard releasable couplers. Articulated rail road cars are often able to carry the same number of highway trailers as single unit cars, but have fewer rail car trucks, thus increasing the lading per truck, reducing the effective ratio of the railcar weight to lading weight, and reducing the slack action along the train consist in service.

When a large number of articulated cars are used, and a lengthy train is to be loaded, it is important that loading proceed in an orderly and efficient manner. The railcars are split at the releasable coupler ends, ramps are moved into place, and wheeled vehicles are loaded in both directions running away from the location of the split. Once loaded, the train is re-assembled by re-joining the coupler ends, and the train departs the loading terminal. The loading of highway trailers has certain special features. First, the highway trailers are backed into position sequentially using a hostler truck, or tractor. Backing a highway trailer on a flat car is a task requiring some care. It is advantageous to align the loading ramp well before commencing loading of the trailers.

At present, time is often wasted aligning the ramps. It would be highly advantageous to have a ramp that can be aligned relatively quickly and easily.

SUMMARY OF THE INVENTION

In an aspect of the invention there is a movable ramp operable to permit wheeled vehicles to be end-loaded onto a deck of a rail road car. The ramp has a trackway assembly along which vehicles can be conducted and a set of wheels to which the trackway assembly is mounted. The wheels facilitate positioning of the trackway assembly relative to the rail road car. The trackway assembly has a first end locatable next to an end of the rail road car, and a second end locatable away from the rail road car next to a base surface that is lower than the deck of the rail road car. At least one guide extends proud of the first end of the trackway assembly. The guide is operable to locate the first end of the ramp relative to the deck, whereby, when the first end is located next to the end of the rail road car, and the second end is located next to the base surface, wheeled vehicles can be conducted between the rail road car deck and the base surface along the trackway assembly.

In an additional feature of that aspect of the invention, the set of wheels includes an axle and a pair of wheels mounted thereto. The axle is mounted at least as close to the first end of the trackway assembly as to the second end thereof In another additional feature, the ramp has a hitch locatable proud of the second end of the trackway assembly, to permit positioning of the ramp by a driving vehicle. In still another additional feature, the guide has a portion that is at least partially tapered, and the at least partially tapered portion is engageable with a structural feature of the railroad car to facilitate alignment of the first end of the trackway assembly relative to the deck of the rail road car. In yet another additional feature, the guide is engageable with a structural member of the rail road car, and the guide is operable to support the first end of the trackway assembly while the wheeled vehicles are conducted between the first and second ends of the trackway assembly.

In a further feature, the guide is a prong mounted to engage a socket of the rail road car. In still a further feature, at least one guide includes a pair of spaced apart prongs mounted to engage the rail road car. In yet a further additional feature, the ramp has a longitudinal direction defined between the first and second ends of the trackway assembly, and a transverse direction defined across the trackway assembly. At least one guide is a pair of transversely spaced fork tines. In another additional feature, the tines are engaged with the rail road car. The tines are operable to support the first end of the trackway assembly while wheeled vehicles are conducted between the first and second ends of the trackway assembly. In still another additional feature, the tines have tapered tips to facilitate alignment of the ramp with the rail road car.

In another aspect of the invention there is a movable ramp and rail road car set. The set has a rail road car having a first end, a second end, and a deck upon which vehicles can be end-loaded. The first end of the rail road car has at least one indexing member. A ramp has a trackway assembly along which vehicles can be conducted and a set of wheels to which the trackway assembly is mounted. The wheels facilitate positioning of the trackway assembly relative to the rail road car. The trackway assembly has a first end locatable next to an end of the rail road car, and a second end locatable away from the rail road car next to a base surface that is lower than the deck of the rail road car. At least one guide extends proud of the first end of the trackway assembly. The guide is operable to engage the indexing member to facilitate alignment of the trackway assembly with the first end of the rail road car.

In an additional feature of that aspect of the invention, the indexing member is a socket defined in the first end of the rail road car. The guide is formed to mate with the socket. In another additional feature, at least one of (a) the guide and (b) the socket, is at least partially tapered. In still another additional feature, the first end has a pair of the sockets and the ramp has a corresponding pair of the guides. In yet another additional feature, the sockets are transversely spaced relative to the deck. In a further additional feature, the rail road car has an end sill, and the sockets are defined in the end sill.

In still a further additional feature, the guide is engageable with a structural member of the rail road car, and the guide is operable to support the first end of the trackway assembly while the wheeled vehicles are conducted between the first and second ends of the trackway assembly. In yet a further additional feature, the ramp has a longitudinal direction defined between the first and second ends of the trackway assembly, and a transverse direction defined across the trackway assembly. At least one guide is a pair of transversely spaced fork tines. In another additional feature of that aspect of the invention, the tines are engaged with the rail road car. The tines are operable to support the first end of the trackway assembly while wheeled vehicles are conducted between the first and second ends of the trackway assembly. In still another additional feature of that aspect of the invention, the tines have tapered tips to facilitate alignment of the ramp with the rail road car.

In another aspect of the invention there is a process of loading wheeled vehicles onto a rail road car. The process includes the steps of providing a rail road car having a first end, a second end, and a deck upon which vehicles can be end-loaded. The first end of the rail road car has at least one indexing member providing a ramp having a trackway assembly along which vehicles can be conducted and a set of wheels to which the trackway assembly is mounted. The wheels facilitate positioning of the trackway assembly relative to the rail road car. The trackway assembly has a first end locatable next to an end of the rail road car, and a second end locatable away from the rail road car next to a base surface that is lower than the deck of the rail road car. At least one guide extends proud of the first end of the trackway assembly. The guide is operable to engage the indexing member to facilitate alignment of the trackway assembly with the first end of the rail road car engaging the guide with the indexing member, advancing the guide relative to the indexing member to align the trackway assembly with the deck of the railroad car and conducting vehicles over the trackway assembly between the base surface and the deck.

In an additional feature of that aspect of the invention, the step of advancing includes moving the guide from a loose engagement position relative to the indexing member, to a seated position. In another additional feature, the rail road car has a longitudinal axis wherein the step of advancing includes the step of centering the trackway assembly relative to the longitudinal axis of the rail road car. In a further additional feature, the guide is used to support the first end of the trackway assembly while conducting vehicles between the base surface and the deck.

In still another aspect of the invention, there is a movable ramp operable to permit wheeled vehicles to be end-loaded onto a deck of a rail road car. The ramp comprising includes a trackway assembly along which vehicles can be conducted. The ramp has a set of wheels. The trackway assembly is mounted on the set of wheels. The wheels facilitate positioning of the trackway assembly relative to the rail road car. The trackway assembly has a first end locatable next to an end of the rail road car, and a second end locatable away from the rail road car next to a base surface that is lower than the deck of the rail road car. A pivotable boom is connected to the trackway assembly. The pivotable boom has a hitch attachment mounted to one end thereof. The pivotable boom is movable between a first position and a second position. In the first position the hitch is presented for engagement by a ramp manoeuvering vehicle. In the second position the trackway assembly is free of obstruction by the boom.

In an additional feature of this aspect of the invention, the boom is counterweighted. In another feature, the boom is a telescoping boom. In the first position the telescoping boom is in an extended condition. In the second position the telescoping boom is in a retracted position.

In another additional feature, the boom includes a first portion pivotally mounted to the trackway assembly, and a second portion mounted to slide telescopingly relative to the first portion. In a further additional feature, the boom has a first end and a second end and pivots about a fulcrum intermediate the first and second ends. The hitch attachment is mounted to the first end. The first portion is movable relative to the second portion to extend the hitch attachment between extended and retracted positions relative to the fulcrum. A counterweight is mounted to the second end of the boom.

In a still further additional feature the ramp has a movable support member operable to secure the boom in a fixed angular position relative to the fulcrum when the first end of the boom is in the extended position. In still another feature, the ramp has a locking member operable to secure the first portion in the extended position relative to the second portion. In a further feature, the locking member is releasable to permit the first portion to be moved between the extended and retracted positions relative to the second portion, and is operable to secure the first portion in the extended position and in the retracted position. The movable support member is operable to maintain the second portion in a raised position to the trackway assembly, the hitch attachment being proud of the trackway assembly when the second portion of the boom is in the raised position. The first portion has handles to facilitate movement between the extended and retracted positions when the second portion is in the raised position.

BRIEF DESCRIPTION OF THE DRAWINGS

FIG. 1a shows a conceptual top view of an articulated vehicle carrying rail road car, in an unloaded condition;

FIG. 1b shows the articulated rail car of FIG. 1a in a split configuration ready for loading;

FIG. 1c shows the articulated rail road car of FIG. 1a in a partially loaded condition;

FIG. 1d shows the articulated rail road car of FIG. 1a in a fully loaded condition;

FIG. 1e shows the rail road car of FIG. 1a in a loaded, assembled condition.

FIG. 2a shows a top view of a ramp for use with the rail road car of FIG. 1a;

FIG. 2b shows a side view of the ramp of FIG. 2a;

FIG. 2c shows a side view of the ramp of FIG. 2a showing its boom in a telescopically collapsed position;

FIG. 4 shows an end view of the rail car unit of FIG. 3a.

DETAILED DESCRIPTION OF THE INVENTION

Figure 2A:
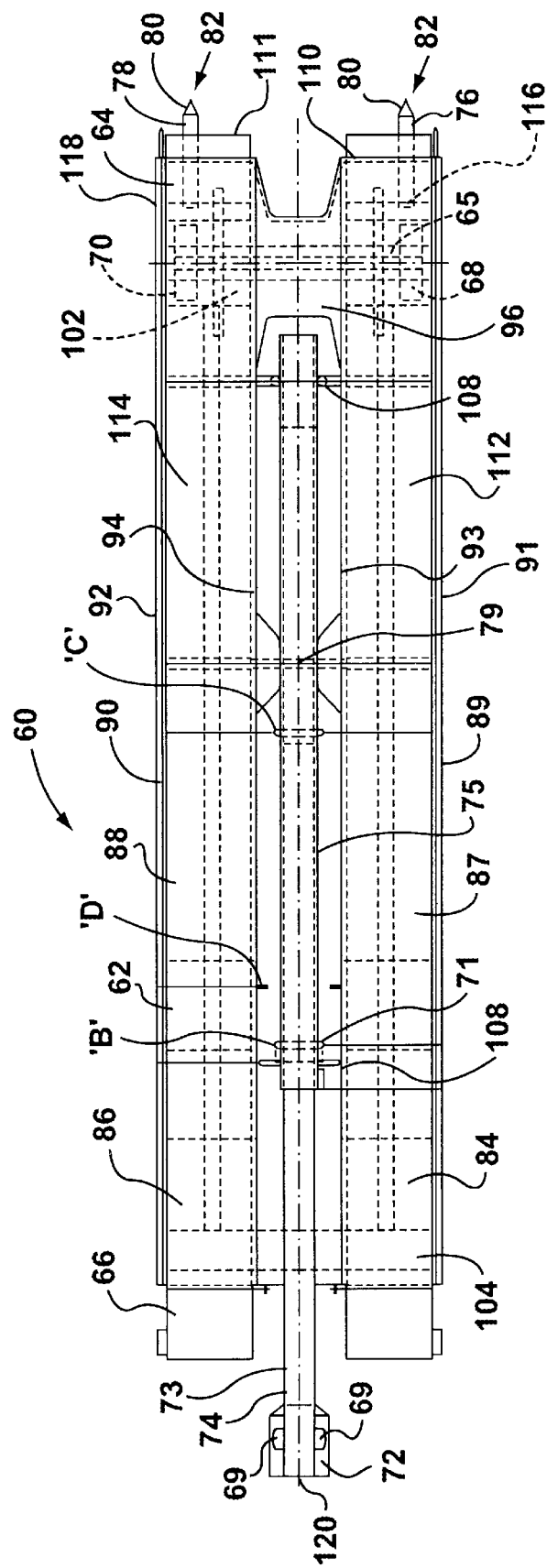

The description that follows, and the embodiments described therein, are provided by way of illustration of an example, or examples of particular embodiments of the principles of the present invention. These examples are provided for the purposes of explanation, and not of limitation, of those principles and of the invention. In the description, like parts are marked throughout the specification and the drawings with the same respective reference numerals. The drawings are not necessarily to scale and in some instances proportions may have been exaggerated in order more clearly to depict certain features of the invention.

In terms of general orientation and directional nomenclature, for each of the rail road cars described herein, the longitudinal direction is defined as being coincident with the rolling direction of the car, or car unit, when located on tangent (that is, straight) track. In the case of a car having a center sill, whether a through center sill or stub sill, the longitudinal direction is parallel to the center sill, and parallel to the side sills, if any. Unless otherwise noted, vertical, or upward and downward are terms that are use top of rail TOR as a datum. The term lateral, or laterally outboard, refers to a distance or orientation relative to the longitudinal centerline of the rail road car, or car unit, indicated as CL—Rail Car. The term "longitudinally inboard", or "longitudinally outboard" is a distance taken relative to a mid-span lateral section of the car, or car unit.

By way of general overview, FIGS. 1a to 1e illustrate the process of loading a multi-unit articulated rail road car. In this example, an articulated rail road car assembly includes a pair of articulated three-pack articulated rail road cars 22 and 24 joined together to form a six rail car unit assembly. There are first and second end units 26, and 28, intermediate articulated units 30 and 32, an intermediate coupled units 34 and 36. A locomotive is shown schematically as 38, a hostler truck is shown schematically as 40, and various highway trailers are shown as 42. For the purposes of this description, it can be taken that units 26 and 28 are the same, units 30 and 32 are the same, and units 34 and 36 are the same. Rail car units 26 and 30, 30 and 34, 36 and 32, and 32 and 28 are joined together by articulated connections mounted over their respective articulated connection trucks. Rail car units 34 and 36 are joined by releasable couplers 44, 46. The gaps between rail car units 26 and 30, 30 and 34, 36 and 32, and 32 and 28 are spanned by permanently mounted bridge plates 47, 48, 49 and 50. Rail car units 34 and 36 are joined by movable bridge plates 58, such that the respective decks 51, 52, 53, 54, 55 and 56 form continuous pathways upon which vehicles can be driven. If additional rail road cars are joined at the opposite ends of rail road cars 22 and 24, further bridge plates can be employed to extend the length of the path.

For the purposes of this description, articulated cars, or combinations of articulated cars having any reasonable number of articulation units can be employed. 2-unit, 3-unit, and 5-unit articulated packs are relatively common.

In FIG. 1b, three pack rail car units 22 and 24 are separated by some distance, typically several hundred feet. Bridge plates 58 are moved to their stored positions. Movable ramps 60 are manoeuvred into position by hostler trucks 40 adjacent the respective separated ends of units 34 and 36.

In FIG. 1c, ramps 60 remain in place. Hostler trucks 40 have been disconnected from ramps 60 and used to load trailers 42. In FIG. 1d, rail road cars 22 and 24 are in a loaded condition. Hostler trucks 40 are again hitched to ramps 60 to draw them clear of the rail way. In FIG. 1e, rail road car assembly has been joined together again, and is ready to be hauled to its destination. Once it has arrived, the series of steps of FIGS. 1a to 1e can be reversed, and trailers 42 unloaded.

Ramp 60 is shown in greater detail in FIGS. 2a and 2b. It has a trackway assembly 62, having a first end 64 for placement adjacent to the nearest end of the rail road car that is to be loaded, such as, for example, the separated ends of either or rail car units 34 and 36 of rail road cars 22 and 24 respectively. First end 64 is positionable at a height corresponding to the deck height of the adjacent rail road car. Trackway assembly 62 also has a second end 66, located distant from first end 64, and, in use distant from the end-loading end of the adjacent rail car unit. Second end 66 is the lower end, and is to be placed against a base surface, such as the ground, or a concrete or asphalt pad from which highway trailers are to be driven onto rail road cars 22 and 24.

First end 64 is mounted above a wheel set, in the nature of an axle 65 and a pair of left and right hand wheels 68, 70. Axle 65 is mounted closer to first end 64 than to second end 66. A manoeuvering fitting, or hitch attachment in the nature of a king pin hitch 72 is provided by which a manoeuvering apparatus such as a tractor, or such as hostler truck 40 can engage ramp 60 and manoeuvre ramp 60 into position adjacent to the loading end of the rail road car. Hitch 72 extends proud of (that is, longitudinally beyond) the distal extremity of second end 66, and is mounted on a pivoting, telescoping boom 74. When hostler truck 40 is disengaged, boom 74, and hence hitch 72, can be released from the raised and extended position shown in FIG. 2b, by removing a securing or locking member, in the nature of a pin 71 from position 'B' shown in FIG. 2a. The inner telescoping portion 73 of boom 74 is slidingly engaged within, and can be collapsed telescopically within, the outer hollow tube portion 75 of boom 74, as shown in FIG. 2c. Gripping members, in the nature of hand grabs or handles 69 are mounted adjacent to king pin hitch 72 to facilitate retraction, or collapse, (and, alternatively, extension) of boom 74. Pin 71 can be reinserted in position 'C', shown in dashed lines in FIG. 2a, to secure portion 73 in its collapsed position relative to portion 75.

A counter-biasing member, in the nature of a counterweight 77 is mounted at the far end (that is, the end away from pin 71) of portion 75 such that when portion 73 is in the retracted, or collapsed, position of FIG. 2c, boom 74 is balanced to pivot on a pivot axle, or bar, indicated as fulcrum 79. It will be appreciated that, ideally, the counter-balancing should be very close to equal, so that boom 74 balances evenly, and can be manipulated relatively easily by hand operation. However, hand operation will be satisfactory even where the boom is not precisely balanced. That is, in the telescopically collapsed, or retracted position, it is desirable that the pivoting force exerted by the operator at handles 69 to either raise or lower boom 74 be less than 50 Lbs., and preferably less than 20 Lbs.

A movable support, stay, or prop, in the nature of a releasable strut 81 is engaged to secure boom 74 in the raised position with hitch 72 proud of trackway assembly 62, and is disengaged from its upright, or vertical, position to permit boom 74 to pivot as shown by arrow 'A' to a lowered, or storage position shy of the profile of trackway 62, (shown in dashed lines). Boom 74 need not be stored in a position fully shy of trackway 62, provided hitch 72 is lowered sufficiently to clear the undercarriage of vehicles to be conducted along ramp 60. However, it is convenient, and conservative, fully to pivot boom 74 to the fully shy position. In the storage position, strut 81 is secured at position 'D' (shown in FIG. 2a, strut 81 being shown in dashed lines in FIG. 2c when secured at position 'D') and hitch 72 and boom 74 are out of the way, such that they do not impede the loading or unloading of vehicles. When it is time to move ramp 60 again, the steps can be reversed—strut 81 moved away from 'D', boom 74 pivoted on its axis, or fulcrum, 79 through the angle of arrow 'A' to raise hitch 72 upward, pin 71 removed from position 'C', portion 73 drawn outward by using handles 69, and pin 71 replaced at position 'B'. All of the steps in moving boom 74 between its operating position (i.e., position for towing) and its storage position, can be performed manually without the aid of a hostler truck or other powered vehicle such as a tractor, loader, or fork-lift.

A pair of indexing members, such as first and second ramp guides in the nature of fork tines, or prongs, 76, 78 are mounted to extend longitudinally proud (that is outboard) of first end 64 to engage a corresponding structural indexing member of the nearest end of the adjacent rail road car. Prongs 76, 78 each have a distal tapered, or conical portion, 80 ending in a rounded tip 82. In use, as ramp 60 is driven toward a rail road car, (be it 22, 24 or some other), one or both of rounded tips 82 will engage the indexing member and tend to follow it as hostler truck 40 continues to advance ramp 60 toward the rail road car. The fit is a loose, or sloppy fit at first, aided by the more forgiving tolerance at the rounded tip and tapered portions of prongs 76, 78. However, as the tapered portions ride against the indexing members, ramp 60 will be forced into a relatively tighter position with much less vertical and lateral tolerance, namely a set, fixed position, or seated position, against the rail car end. This chosen position is longitudinally aligned with the pathway defined by the decking of the adjacent rail road car, and, preferably, is centered relative to the longitudinal axis of the rail road car. The positive location feature of the guides may tend to reduce the need for repeatedly backing and manoeuvring the ramp to achieve the right position, and may tend to eliminate guesswork or discretionary judgement, particularly during loading or unloading operations late at night, or at other times or circumstances when precise alignment skills may be diminished.

Considering this structure in greater detail, trackway assembly 62 has a pair of parallel, spaced apart left and right hand tracks, or wheel ways 84 and 86 each having a decking web 87, 88 upon which wheeled vehicles can run, a vertical side flange 89, 90 having an upwardly extending skirt 91, 92 that acts as a curb to guide the wheels of highway trailers, and an inner edge flange 93, 94 to stiffen the inner edge of each web. The spacing of the ways is maintained by a transversely extending shear panel 96 at a first end 64 of trackway assembly 62, shear panel 96 having a wheel-well 102 formed in it; and by a transverse lateral structural member, or cross-member 104 located at second end 66. Twisting of boom 74 on its pivot fulcrum 79 in the horizontal plane, as when a turning force is exerted by the hostler truck at hitch 72, is discouraged, or limited by restraining members in the nature of vertical angle irons 108 located longitudinally inboard of cross-member 104.

A transversely extending endwall 110 extends downwardly somewhat inboard of the proximal edges 111 of ways 84 and 86 at first end 64. A pair of webs 112 and 114 also extend transversely beneath ways 84 and 86, running laterally inboard from side flanges 89, 90 respectively to meet inner edge flanges 93, 94, each web thereby co-operating to form respective relatively stiff, open bottomed boxes. The roots 116 and 118 or shafts, of prongs 76 and 78 extend through (and are welded to) endwall 110, and through webs 112 and 114 respectively, to which they are also welded. End wall 110 is deflected inwardly in its central portion to accommodate the disconnected coupler end of the adjacent rail road car.

Being spaced apart to left and right hand lateral sides of ramp centerline 120, and rooted thusly, prongs 76, 78 are able to bear the structural load of first end 64 when highway trailers, or other wheeled vehicles ascend or descend trackway assembly 62 between the base surface and the deck of the rail road car adjacent to first end 64. Thus prongs 76, 78 serve the double function of guiding ramp 60 to a seated position, and of carrying the vertical shear load at first end 64 in operation. Retention hooks 122 are provided to discourage ramp 60 from pulling away from the end of the adjacent rail road car unexpectedly.

Figure 3A:
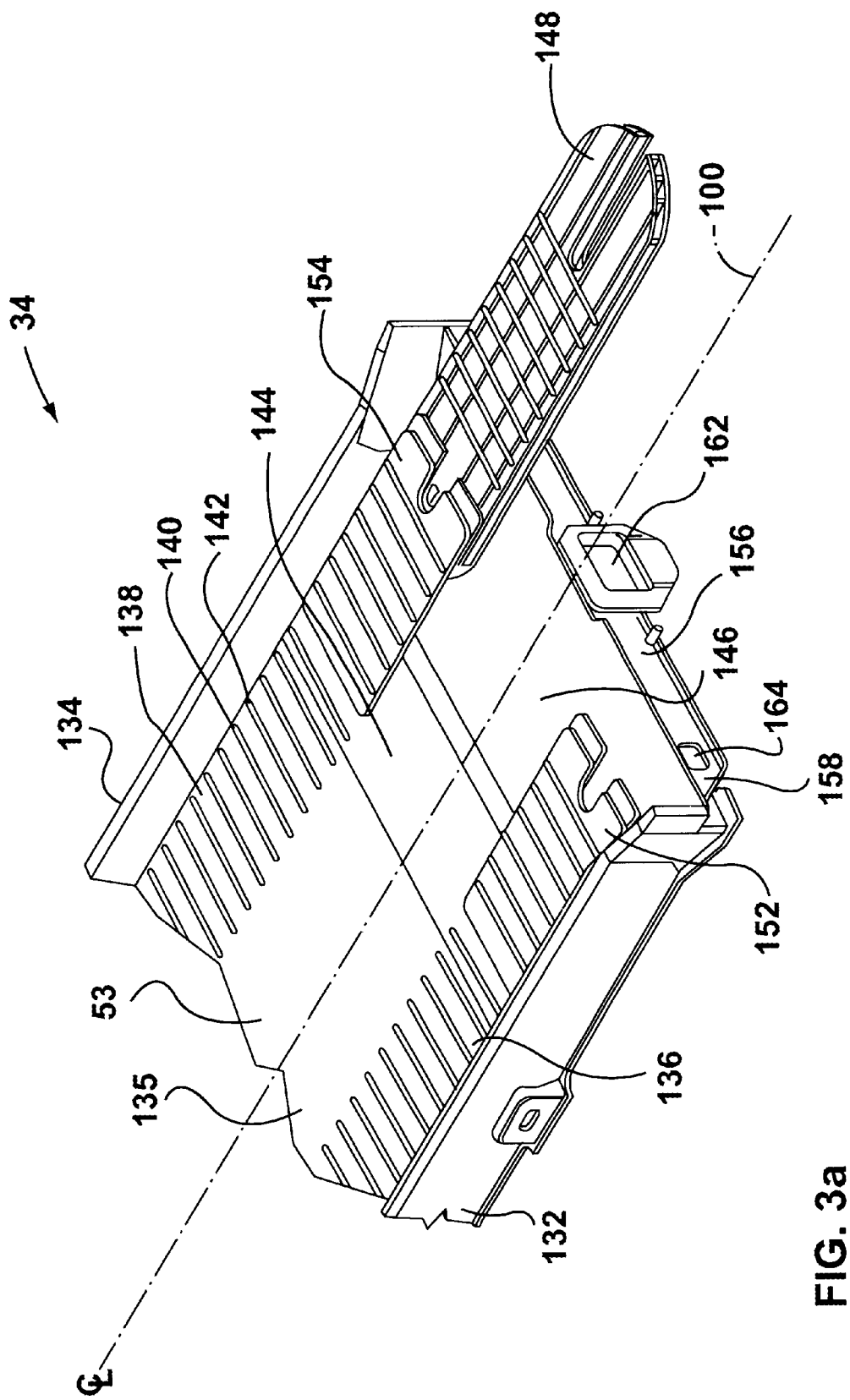
FIG. 3a shows a partial perspective end view of one of the rail car units of the rail road car of FIG. 1a, with the bridge plate in a deployed position.
Figure 3B:
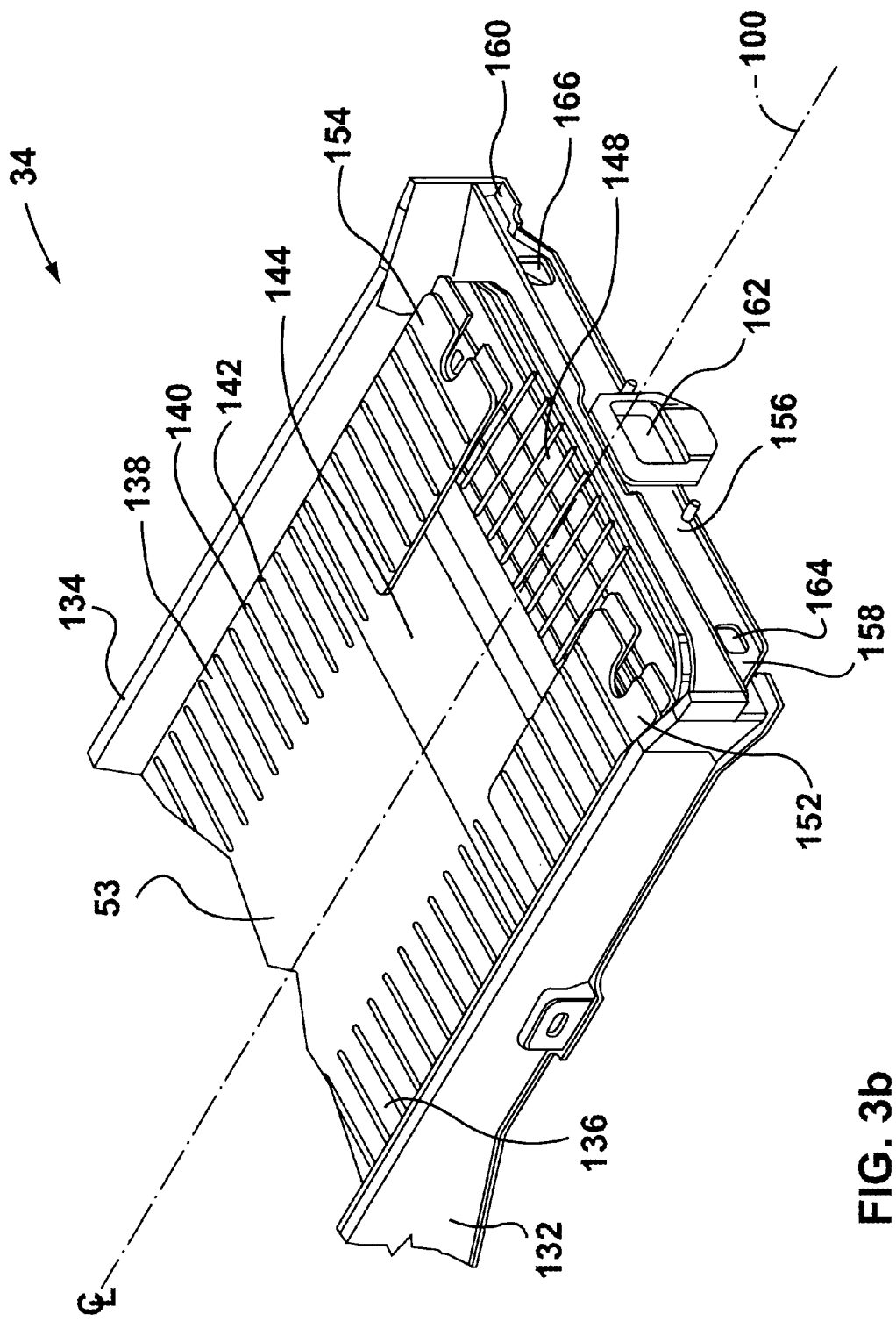
FIG. 3b shows a similar view to that of FIG. 3a, with the bridge plate in a stored position.
Figure 4:
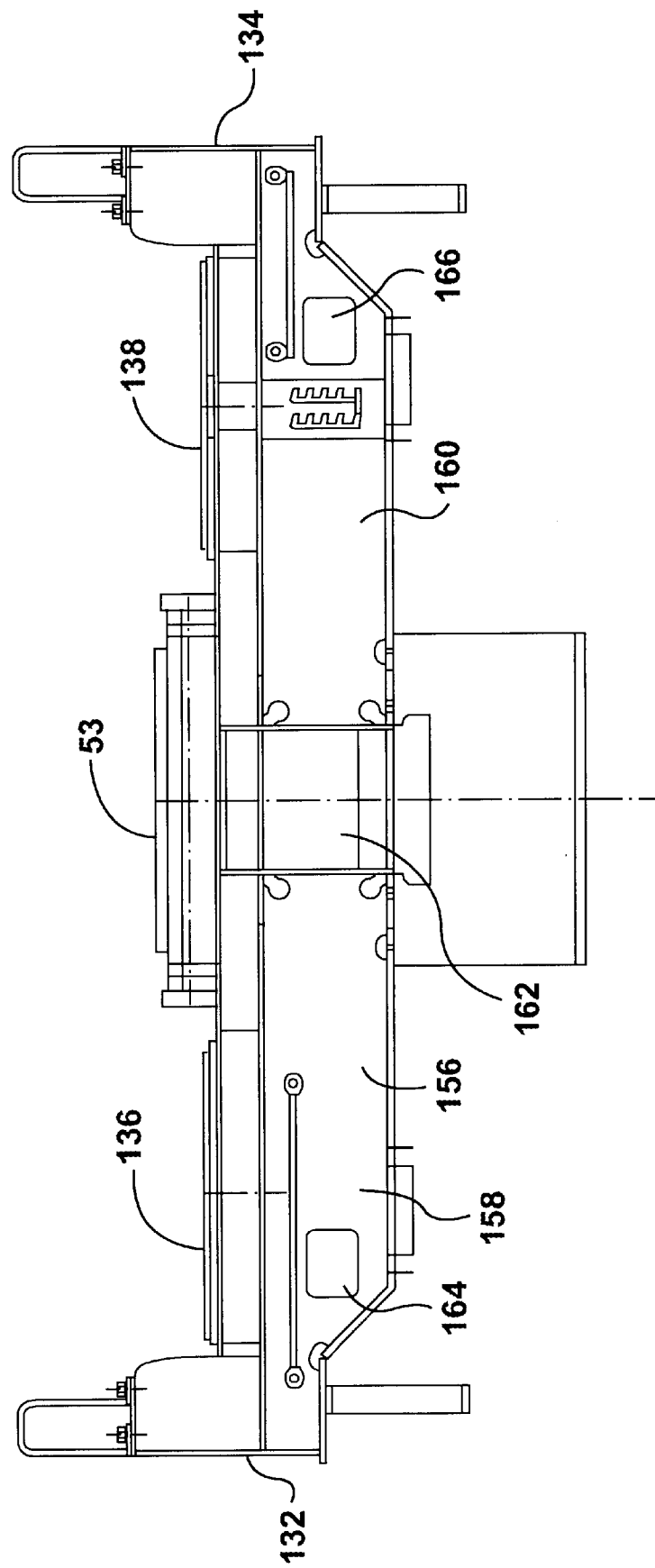

FIGS. 3a, 3b and 4 show the separated coupling end of a multi-unit articulated rail road car, such as rail road car 22 or 24, with the releasable coupler removed. For the purposes of description, the rail car unit end of FIG. 3a will be described as being the separated end of rail car unit 34 of rail road car 22, although it could be rail car unit 36, or some other having the same features. The rail road car longitudinal centerline, at the coupler pocket, is indicated as 100.

Rail car unit 34 has a main deck 53 that is supported by a main center sill, and cross-bearers (not shown), and bounded on its outboard margins by a pair of left and right hand side sills 132, 134. Deck 53 has a central portion, being the top flange 135 of the center sill, bracketed between a pair of wheel ways, or left and right hand wheel paths 136, 138. Paths 136 and 138 are each provided with an array of parallel, spaced apart traction bars 140, 142. Deck 53 has a transverse coupler end deck plate 144, and a downward step, or shelf 146, lying outboard of plate 144. The downward step accommodates a bridge plate 148 in its stored position, as shown in FIG. 3b. Intermediate bridge plate transition plates 152 and 154 are hingedly mounted to plate 144. In use, the toe of another bridge plate, like bridge plate 148, from another road car unit, such as rail road car unit 36, seats under plate 152. The hinged mounting allows for insertion and removal, and allows for train motion during travel. Shelf 146 terminates at a longitudinally outboard edge that lies over, and is supported by, an end sill 156 having left and right end sill portions 158, 160. Portions 158, 160 run between the main sill coupler pocket 162 to left and right hand side sills 132, 134 respectively.

As shown in FIG. 3b, each of the left and right hand end sill portions has defined in it an indexing member, in the nature of a rectangular aperture through the web of end sill portions 158, 160 respectively, identified as respective sockets 164, 166 for mating engagement with one or the other of prongs 76, 78 of ramp 60. Sockets 164, 166 are located near the distal, or outboard ends, of end sill 156, and provide a relatively large moment arm to tend to discourage or prevent twisting of ramp 60 in the roll direction (i.e., rotation about the longitudinal axis of the rail road car) relative to deck 53. Also, end sill 156 is a structural member capable of carrying vertical shear loads between side sills 132, 134 and the main sill central sill. In this way, the vertical shear load carried in prongs 76, 78, during loading and unloading is reacted by end sill 156 and the supporting end structure of rail road car unit 36.

Although prongs 76, 78 (and sockets 164, 166) are rectangular in section, it will be appreciated that a round, oval or other profile could be used. Other types of guiding and alignment members can be used rather than a sockets, such as an angle iron or C-channel forming a slide-way, provided that the mating portion on the railcar does not extend beyond the striker plates.

Various embodiments of the invention have now been described in detail. Since changes in and or additions to the above-described best mode may be made without departing from the nature, spirit or scope of the invention, the invention is not to be limited to those details, but only by the appended claims.

I claim:

1. A movable ramp operable to permit wheeled vehicles to be end-loaded onto a deck of a rail road car, said ramp comprising:
   a trackway assembly along which vehicles can be conducted;
   a set of wheels to which said trackway assembly is mounted, said wheels facilitating positioning of said trackway assembly relative to the rail road car;
   said trackway assembly having a first end locatable next to an end of the rail road car, and a second end locatable away from the rail road car next to a base surface that is lower than the deck of the rail road car; and
   at least one guide extending proud of said first end of said trackway assembly, said guide being operable to locate said first end of said ramp relative to the deck;
   whereby, when said first end is located next to the end of the rail road car, and said second end is located next to the base surface, wheeled vehicles can be conducted between the rail road car deck and the base surface along said trackway assembly.

2. The movable ramp of claim 1 wherein:
   said ramp has a telescoping, pivoting boom;
   said boom has a first portion pivotally mounted to said trackway assembly, and a second portion having a proximal end mounted to slide within said first portion, and a distal end having a hitch fitting mounted thereto;
   said hitch is movable on said boom to a storage position clear of said trackway and to a towing position proud of said trackway;
   in said towing position said second portion is extended relative to said first portion;
   in said storage position said second portion is retracted relative to said first portion; and
   said boom is counterweighted to facilitate manual pivoting motion thereof.

3. The movable ramp of claim 1 wherein said set of wheels includes an axle and a pair of wheels mounted thereto, said axle being mounted at least as close to said first end of said trackway assembly as to said second end thereof; and said ramp has a hitch locatable proud of said second end of said trackway assembly, to permit positioning of said ramp by a driving vehicle.

4. The movable ramp of claim 1 wherein said guide has a portion that is at least partially tapered, and said at least partially tapered portion is engageable with a structural feature of the railroad car to facilitate alignment of said first end of said trackway assembly relative to the deck of the rail road car.

5. The movable ramp of claim 1 wherein said guide is engageable with a structural member of the rail road car, and said guide is operable to support said first end of said trackway assembly while the wheeled vehicles are conducted between said first and second ends of said trackway assembly.

6. The movable ramp of claim 1 wherein said guide is a prong mounted to engage a socket of the rail road car.

7. The movable ramp of claim 1 wherein said at least one guide includes a pair of spaced apart prongs mounted to engage the rail road car.

8. The movable ramp of claim 1 wherein:
   said ramp has a longitudinal direction defined between said first and second ends of said trackway assembly, and a transverse direction defined across said trackway assembly; and
   said at least one guide is a pair of transversely spaced fork tines.

9. The movable ramp of claim 8 wherein when said tines are engaged with the rail road car, said tines are operable to support said first end of said trackway assembly while wheeled vehicles are conducted between said first and second ends of said trackway assembly.

10. The movable ramp of claim 9 wherein said tines have tapered tips to facilitate alignment of said ramp with the rail road car.

11. A movable ramp and rail road car set, said set comprising:
    a rail road car having
       a first end, a second end, and a deck upon which vehicles can be endloaded;
       said first end of said rail road car having at least one indexing member;
    a ramp having
       a trackway assembly along which vehicles can be conducted;
       a set of wheels to which said trackway assembly is mounted, said wheels facilitating positioning of said trackway assembly relative to said rail road car;
       said trackway assembly having a first end locatable next to one of said ends of said rail road car, and a second end locatable away from said rail road car next to a base surface that is lower than said deck of said rail road car; and
       at least one guide extending proud of said first end of said trackway assembly, said guide being operable to engage said indexing member to facilitate alignment of said trackway assembly with said first end of said rail road car.

12. The ramp and rail road car set of claim 11 wherein said indexing member is a socket defined in said first end of said rail road car, said guide being formed to mate with said socket.

13. The ramp and rail road car set of claim 12 wherein at least one of (a) said guide and (b) said socket, is at least partially tapered.

14. The ramp and rail road car set of claim 12 wherein said first end of said rail road car has a pair of said sockets and said ramp has a corresponding pair of said guides.

15. The ramp and rail road car set of claim 14 wherein said sockets are transversely spaced relative to said deck.

16. The ramp and rail road car set of claim 15 wherein said rail road car has an end sill, and said sockets are defined in said end sill.

17. The ramp and rail road car set of claim 11 wherein said guide is engageable with a structural member of said rail road car, and said guide is operable to support said first end of said trackway assembly while the wheeled vehicles are conducted between said first and second ends of said trackway assembly.

18. The ramp and rail road car set of claim 11 wherein said ramp has a longitudinal direction defined between said first and second ends of said trackway assembly, and a transverse direction defined across said trackway assembly; and said at least one guide is a pair of transversely spaced fork tines.

19. The ramp and rail road car set of claim 18 wherein when said tines are engaged with said rail road car, and said tines are operable to support said first end of said trackway assembly while wheeled vehicles are conducted between said first and second ends of said trackway assembly.

20. The ramp and rail road car set of claim 18 wherein said tines have tapered tips to facilitate alignment of said ramp with said rail road car.

21. A process of loading wheeled vehicles onto a rail road car, said process comprising the steps of:

provic a rail road car having
a first end, a second end, and a deck upon which vehicles can be end-loaded;
said first end of said rail road car having at least one indexing member;

providing a ramp having
a trackway assembly along which vehicles can be conducted;
a set of wheels to which said trackway assembly is mounted, said wheels facilitating positioning of said trackway assembly relative to said rail road car;
said trackway assembly having a first end locatable next to one of said ends of said rail road car, and a second end locatable away from said rail road car next to a base surface that is lower than said deck of said rail road car; and
at least one guide extending proud of said first end of said trackway assembly, said guide being operable to engage said indexing member to facilitate alignment of said trackway assembly with said first end of said rail road car;
engaging said guide with said indexing member;
advancing said guide relative to said indexing member to align said trackway assembly with said deck of said railroad car; and
conducting vehicles over said trackway assembly between said base surface and said deck.

22. The process of claim 21 wherein the step of advancing includes moving the guide from a loose engagement position relative to the indexing member, to a seated position.

23. The process of claim 21, the rail road car having a longitudinal axis, and wherein the step of advancing includes the step of centering said trackway assembly relative to the longitudinal axis of the rail road car.

24. The process of claim 21 further including the step of using said guide to support said first end of said trackway assembly while conducting vehicles between said base surface and said deck.

25. A movable ramp operable to permit wheeled vehicles to be end-loaded onto a deck of a rail road car, said ramp comprising:

a trackway assembly along which vehicles can be conducted;
a set of wheels to which said trackway assembly is mounted, said wheels facilitating positioning of said trackway assembly relative to the rail road car;
said trackway assembly having a first end locatable next to an end of the rail road car, and a second end locatable away from the rail road car next to a base surface that is lower than the deck of the rail road car; and
a pivotable boom connected to said trackway assembly, said pivotable boom having a hitch attachment mounted to one end thereof;
said pivotable boom being movable between a first position and a second position;
in said first position said hitch is presented for engagement by a ramp manoeuvering vehicle; and
in said second position said trackway assembly is free of obstruction by said boom.

26. The ramp of claim 25 wherein said boom is counterweighted.

27. The ramp of claim 25 wherein said boom is a telescoping boom, and, in said first position said telescoping boom is in an extended position, and in said second position said telescoping boom is in a retracted position.

28. The ramp of claim 25 wherein said boom includes a first portion pivotally connected to said trackway assembly, and a second portion mounted to slide telescopingly relative to said first portion.

29. The ramp of claim 28 wherein:

said boom has a first end and a second end and pivots about a fulcrum intermediate said first and second ends;
said hitch attachment is mounted to said first end;
said first portion is movable relative to said second portion to extend said hitch attachment between said extended and retracted positions relative to said fulcrum; and
a counterweight is mounted to said second end thereof.

30. The ramp of claim 29 wherein said ramp has a movable support member operable to secure said boom in a fixed angular position relative to said fulcrum when said first end of said boom is in said extended position.

31. The ramp of claim 30 wherein said ramp has a locking member operable to secure said first portion in said extended position relative to said second portion.

32. The ramp of claim 31 wherein:

said locking member is releasable to permit said first portion to be moved between said extended and retracted positions relative to said second portion, and is operable to secure said first portion in said extended position and in said retracted position;
said movable support member is operable to maintain said second portion in a raised position to said trackway assembly, said hitch attachment being proud of said trackway assembly when said second portion of said boom is in said raised position; and
said first portion has handles to facilitate movement between said extended and retracted positions when said second portion is in said raised position.

* * * * *